United States Patent [19]

Elliott

[11] 3,794,410

[45] Feb. 26, 1974

[54] ARTICULATED MIRROR

[75] Inventor: James E. Elliott, San Pedro, Calif.

[73] Assignee: MCA Disco-Vision, Inc., Universal City, Calif.

[22] Filed: Feb. 20, 1973

[21] Appl. No.: 333,559

[52] U.S. Cl. .................... 350/285, 178/7.6, 310/8.5, 350/6

[51] Int. Cl. .................... G02b 7/24

[58] Field of Search.. 350/6, 285; 324/109; 178/7.6; 310/8, 8.5, 9.1

[56] References Cited

UNITED STATES PATENTS

| | | | |
|---|---|---|---|
| 1,438,974 | 12/1922 | Wente | 324/109 |
| 1,789,521 | 1/1931 | Feingold | 324/109 |
| 3,544,201 | 12/1970 | Fowler et al. | 350/285 |
| 3,108,161 | 10/1963 | Tourtellot | 310/8.5 |

*Primary Examiner*—Ronald L. Wibert
*Assistant Examiner*—Steven K. Morrison
*Attorney, Agent, or Firm*—Marvin H. Kleinberg

[57] ABSTRACT

An improved articulated mirror provides "fine" tracking control for a transducer arm and tracking assembly which is servo controlled from the playback circuits to follow the information track on a video disc. A polycrystalline piezoelectric bimorph motor driver is constrained to bend in an arcuate bow shape. The mirror is mounted on a free end that moves through an angle as the main body bows.

7 Claims, 4 Drawing Figures

ARTICULATED MIRROR

RELATED PATENT APPLICATIONS AND PATENTS

"Video Disc Player" by James E. Elliott, Ser. No. 314,082, filed Dec. 11, 1972; "Video Disc Player" by James E. Elliott, Ser. No. 299,893, filed Oct. 24, 1972; "Video Recording and Reproducing System" by Kent D. Broadbent, Ser. No. 299,892, filed Oct. 24, 1972; "Drop-Out Compensator" by Wayne Ray Dakin, Ser. No. 299,891, filed Oct. 24, 1972; "Video Record Disc and Process for Making Same" by David P. Gregg, Ser. No. 735,007, filed Jan. 27, 1969; "Duplicating Process for Video Disc Records" by Kent D. Broadbent, U.S. Pat. No. 3,658,954, issued Apr. 25, 1972; "Video Signal Transducer Having Servo Controlled Flexible Fiber Optic Track Centering" by David P. Gregg and Keith O. Johnson, U.S. Pat. No. 3,530,258, issued Sept. 22, 1970; "Video Recording Medium and Transport" by David P. Gregg, U.S. Pat. No. 3,430,966, issued Mar. 4, 1969; "Photoelectric Transducer Head" by David P. Gregg, U.S. Pat. No. 3,349,273, issued Oct. 24, 1967; "Video Disc Playback Assembly" by Keith O. Johnson, U.S. Pat. No. 3,518,442, issued June 30, 1970; "Duplicating Process for Video Disc Records" by Kent D. Broadbent, U.S. Pat. No. 3,687,664, issued Aug. 29, 1972.

BACKGROUND OF THE INVENTION

1. Field of the Invention

This invention relates to information retrieval apparatus and, more particularly, to an articulated mirror adapted to follow a video information track on the surface of a video disc.

2. Description of the Prior Art

It has been known that color video programs can be stored on magnetic tape for subsequent playback, utilizing appropriate video tape reading apparatus. It has also been disclosed that the same information can be recorded on a disc, either through photographic or other processes which achieve a physical deformation of the disc in a predetermined pattern, which can then be optically "read" to recover a video signal suitable for application to a standard TV receiver.

In the teachings of the prior art, and especially the patents to Gregg and Johnson and the application of Elliott, supra, apparatus has been disclosed which is adapted to cooperate with the video disc disclosed by Gregg, Johnson, Broadbent, et al., supra. Continued experimentation has led to the development of video disc having a surface upon which information is stored as "holes" or depressions in a surface.

On a typical video disc, a given hole may be approximately 1 micron in width. A plurality of such holes of varying lengths are placed in a more or less continuous track on a surface of a disc. The disc is adapted to rotate at approximately 1,800 rpm for playback. In alternate configurations, the disc may either have a continuous spiral track containing information or may include a plurality of discrete, circular tracks. In either embodiment, a track-to-track spacing of approximately 2 microns is maintained. At such rotational speeds, approximately twenty (20) minutes of program can be accommodated on a 12 inch diameter disc.

In order to provide a commerically successful system, several requirements must be simultaneously satisfied. The video disc which contains the program material must be easily mass produced, able to take a certain amount of handling and must function on a playback instrument which must be reasonable in cost and sufficiently simple and rugged so that it might function in the environment of a home.

Techniques are available to mass produce discs using techniques which are analogous to those employed in the phonograph record industry. It has been determined that a video disc can be made of thin material without substantial lateral rigidity. Such a disc can accept information in a "hole-no-hole" pattern which can be optically recognized by suitable playback equipment.

The series of holes of interest is arranged in a 1 micron wide track separated from an adjacent series of holes in a 1 micron track by approximately 1 micron. The distance between the centers of adjacent racks is, in the preferred embodiment therefore, approximately 2 microns.

Sufficient energy must be applied to and recovered from the surface to distinguish between the surface states that represent information, and to provide an error signal which enables a control system to maintain the transducer in alignment with the track of interest in an environment of shocks and vibration.

SUMMARY OF THE INVENTION

An improved playback system has been developed for reproducing video information from a flexible video disc. This improved system includes a turntable which provides a hydrodynamic fluid bearing which affords a noncontact support for the entire disc and an improved reading head which utilizes a negative pressure differential in the vicinity of the head.

An improved optical system has been developed using a single, articulated mirror of novel design that enables the recorded 1 micron wide track to be "followed" notwithstanding relative radial displacement of the player arm and head assembly with respect to the disc of several mils of travel.

It has been taught that the same optical system that directs the reading beam to the disc surface can be used to convey a reflected beam containing information to an appropriate transducer assembly. The novel articulated mirror of the present invention permits such a system to be employed with an acceptable loss of light due to reflectivity of the mirror.

According to the present invention, a pair of polarized polycrystalline piezoelectric ceramic wafers are bonded to opposite sides of a flexible, conductive strip. The strip is held at both ends one of which has a short, free cantilevered portion to which is fastened the reflecting surface. The plane of the reflecting surface is perpendicular to the plane of the wafers.

Electrode connections are made to the wafers and to the central strip as well. The central strip then may be considered a ground or common. A relatively positive potential is applied to one wafer and a relatively negative potential is applied to the other wafer.

The piezoelectric ceramic wafers simultaneously expand and contract, respectively, causing the strip to bend in an arc between the points of clamping. A reversal of polarities reverses the curvature of the bend. The free cantilever with the reflecting surface attached is thereby moved in a limited arc. Light from a remote source impinging upon the mirror will strike the reflecting surface at different incident angles, depending upon the direction and amount of bow induced in the strip. For each incident angle, the beam will be reflected at a corresponding angle.

In a transducing player arm, therefore, if the beam is directed to a first radial location of the disc with no potential applied to the wafers, by controlling the polarity and magnitude of the applied voltage, the point of impingement of the light beam on the disc can be shifted radially. Light reflected from the disc retraces the path of the incident light.

Measuring the average intensity of the returning light beam, a transfer function can be developed so that an error signal derived from a change in the average intensity can be used to "drive" the mirror in a predetermined fashion to diminish the "error" and to maintain the spot at the radial distance of the track being followed.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

In FIGS. 1 and 2 there are shown the elements of an articulated mirror 10. Basically, the articulated mirror 10 includes a reflecting surface 12 and a piezoelectric bimorph motor-driver 14 which is mounted in a frame 16 that clamps the motor-driver 14 at each end. Electrical terminals 18, 20, 22 are provided to apply electrical energy to the motor-driver 14.

The motor-driver 14 is preferably a pair of sheets 24, 26 of a piezoelectric polycrystalline ceramic, such as barium titanate or lead zirconate titanate which, when suitably polarized, expands or contracts in the presence of an applied electrical potential difference. The two piezoelectric sheets 24,26 are bonded to the opposite sides of a conductive, flexible plate member 28 which is adapted to be coupled to a source of common reference potential and which serves as a common ground.

Figure 1:
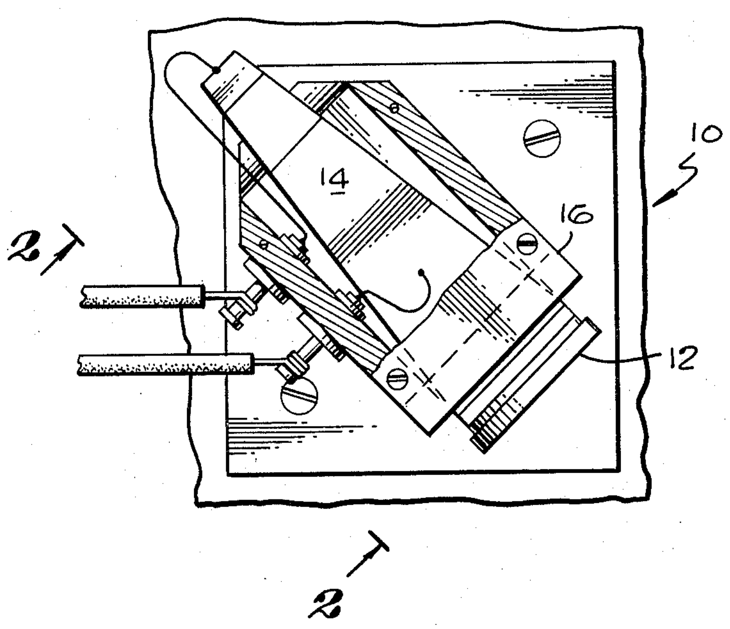
FIG. 1 is a top view of an articulated mirror according to the present invention.
Figure 2:
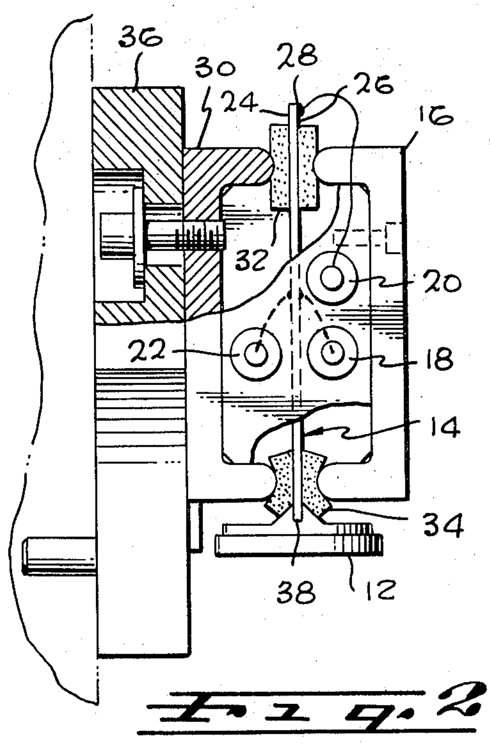
FIG. 2 is a side section view of the mirror of FIG. 1 taken along the lines 2—2 in the direction of the appended arrows.

From FIGS. 1 and 2 it will be seen that the frame 16 connects to a substantially similar frame member 30, and the motor-driver 14 is clamped between the two frame members 16, 30 with elastomer pads 32, 34 at the points of clamping. The entire assembly is fastened to a mounting bar 36 which can be adjustably affixed to a player arm (not shown).

A short, free end 38 extends from one end of the frame, and the reflecting surface 12 is bonded to the free end with the reflecting plane substantially orthogonal to the plane of the plate member 28. The free end 38 pivots about the line of clamping.

Figure 3:
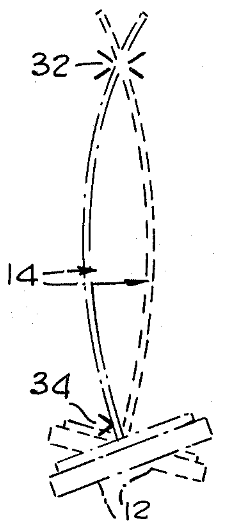
FIG. 3 is an idealized diagram indicating the motion imparted to the mirror mounting through the application of electrical energy.

Referring next to FIG. 3 which illustrates the mirror in operation, with the front and rear elastomer pads 32, 34 holding the motor-driver 14 in a relatively "floating" condition, applying a potential difference to the top and bottom electrodes 18, 22 with a first polarity tends to cause the piezoelectric ceramic on one side to expand and on the opposite side to contract, thereby introducing a bow into the motor-driver. By reversing the polarity of the applied potential, an equal but opposite bow in introduced.

With the center portion between the clamps bowing, the free end 38, to which the reflecting surface 12 is bonded, tends to move in an arc about the node which is created at the line of clamping. This "oscillatory" motion changes the plane of the mirror surface.

By controlling the polarity and amplitude of the potential difference applied to the opposite faces of the motor-driver 14, the reflecting surface 12 can be moved to change the effective point of impringement on a disc surface of an incident reading beam. Similarly, the reflected beam from the disc surface will be directed along the same optical path, but in the opposite direction.

The amount of deflection of the mirror surface 12 is directionally proportional to the magnitude of the signal applied to the motor-driver 14. The transfer functions can determine an appropriate servo system mechanization whereby an error signal, derived from the average intensity of the returned radiation, redirects the mirror, thereby "locking" the scan on a particular "track" on the disc.

Figure 4:
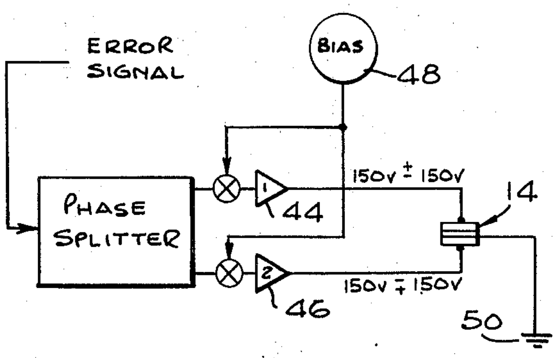
FIG. 4 is an idealized circuit diagram of the circuits driving the mirror.

Turning next to FIG. 4, there is shown schematically an electrical circuit for applying an error signal to drive the motor driver 14. The error signal, which can be independently derived from the return signal, as taught in any of the above-identified related patent applications, is applied to phase splitter circuit which provides on a pair of output lines complementary signals of equal amplitude but opposite phase.

The output of the phase splitter is applied to a pair of operational amplifiers 44, 46, each of which is initially biased through a summing junction from a source 48 nominally set to provide a 150-volt output.

The first amplifier 44 couples to a first of the terminals 18 while the other amplifier 46 is coupled to the other of the terminals 22. The flexible plate 28 is coupled to the third terminal 20 and is connected to a source of common reference potential 50 indicated by the conventional ground symbol.

The first and second amplifiers 44, 46 are adjusted to provide a maximum output voltage of 300 volts. At all times, the piezoelectric sheets 24, 26 have equal but opposite potential supplied thereto.

In operation, for maximum deflection, the output of one of the amplifiers will be the amplified sum of the bias and the phase splitter output which results in a 300-volt signal applied to one of the piezoelectric sheets. At the same time, the other amplifier provides an output signal 0-volts resulting from the amplified sum of the bias and the phase splitter output, the second sheet, thereby developing a 300-volt potential difference between them.

The bias is deemed necessary to prevent depolarization of the piezoelectric ceramic sheets 24, 26. Accordingly, the bias is selected to prevent a net voltage across the sheets 24, 26 which would be of sufficient magnitude to reverse the polarization and therefore destroy the piezoelectric properties of the sheets.

Thus, there has been shown an improved articulated mirror employing a novel motor driver combination of relatively low mass and quick response to applied electrical signals. Further, the novel motor driver of the present invention can be easily fabricated from available components.

A novel electrical circuit has also been disclosed which is intended to operate the articulated mirror without inadvertently depolarizing the polycrystalline piezoelectric ceramic which comprises the motor driver portion of the mirror. Other modifications and variations will appear to those skilled in the art, and accordingly, the scope of the invention should be limited only by the claims appended hereto.

What is claimed as new is:

1. A movable mirror for use in an optical system to displace a radiant beam comprising in combination:

a. a bendable bar member adapted to respond to applied energy for simultaneously expanding and contracting opposite surfaces;

b. rigid support means, including means for restraining motion near one end of said bar member and for restraining motion at a point near the opposite end of said bar member, thereby leaving at least one relatively short, cantilevered free end portion;

c. a mirror rigidly attached to said cantilevered free end with the plane of the surface of said mirror orthogonal to the long axis of said bendable bar member; and d. energy applying means coupled to said bar member whereby applied energy drives said bar member into a curve intermediate said support means and moving said cantilevered free end in an arc about said adjacent motion restraining means, for changing the angles of incidence and reflection of said mirror relative to an applied radiant beam.

2. The movable mirror of claim 1 wherein said bendable bar member comprises an elongated flexible metal sheet and first and second piezoelectric sheets respectively bonded to opposite surfaces of said metal sheet;

and said energy applying means include a source of electrical energy and electrodes coupled to said source attached to said first and second piezoelectric sheets for applying electrical energy thereto.

3. The movable mirror of claim 2 further including an electrode adapted to couple said metal sheet to a source of common reference potential whereby energy applied to said first and second piezoelectric sheets is of respectively opposite polarity causing simultaneous expansion of one and contraction of the other of said piezoelectric sheets.

4. The movable mirror of claim 1 wherein said means for restraining motion include elastomeric pads for clamping said bar member between opposing holding jaws whereby two nodes are created at the lines of restraint.

5. In an articulated mirror driving assembly, motor means fastened to the mirror comprising:

a. a central, conductive flexible support member adapted to be connected to a source of common reference potential;

b. a first piezoceramic plate having an electrode, bonded to one side of said central member;

c. a second piezoceramic plate having an electrode, bonded to the other side of said central member;

d. first clamping means affixed to said motor means at a first fixed end;

e. second clamping means affixed to said motor means near the opposite end but displaced therefrom, providing a limited, cantilevered free end to which the mirror is fastened; and f. means for applying a potential difference as between said first and second piezoceramic planes, whereby one of said plates expands and the other contracts introducing a curve between said first and second clamping means, said cantilevered free end and the mirror attached thereto moves in an arc, effectively rotating the plane of the face of the mirror.

6. The motor driving assembly of claim 5, above, wherein said clamping means include elastomeric pads to enable pivotal motion at the line of clamping.

7. The motor driving assembly of claim 5, above, wherein said means for applying a potential difference include bias means for maintaining the potentials at said first and second plates at the same polarity.

* * * * *